March 25, 1969   J. DECKER   3,434,244
GRINDING MACHINERY FOR FINISHING BRAKE DISCS
Filed April 3, 1967

United States Patent Office 3,434,244
Patented Mar. 25, 1969

3,434,244
GRINDING MACHINERY FOR FINISHING BRAKE DISCS
Jacob Decker, Cincinnati, Ohio, assignor to The Cincinnati Milling Machine Co., Cincinnati, Ohio, a corporation of Ohio
Filed Apr. 3, 1967, Ser. No. 627,815
Int. Cl. B24b 5/02, 29/00, 39/04
U.S. Cl. 51—106                             8 Claims

ABSTRACT OF THE DISCLOSURE

A method for grinding a brake disc flat and square with its axis of rotation and the provision of a special fixture apparatus useful in performing the method to locate, orient and hold the disc using its axis of rotation as the reference and to support the disc solidly during the grinding process.

BACKGROUND

A brake disc is generally in the shape of a relatively thin flange extending a substantial radial distance outward from a center hub section through which the axis of rotation of the disc passes. This axis must be exactly perpendicular to each of the opposite sides of the disc to prevent wobble of the disc when it is rotated. Therefore the two sides of the disc must also be exactly parallel with one another and the disc must be of an exactly parallel with one another and the disc must be of an exactly uniform thickness. These equirements of perpendicularity (or squareness), parallelism and uniformity of thickness ae essential to satisfactory performance of a brake disc in a vehicle.

The shape of the disc member itself with the large and relatively thin radial portion which tends to flex during both its formation by conventional rough turning operations and its final finishing by precision grinding has caused the production of these parts to be very slow and unreliable. The parts are therefore very expensive due both to the time required for their production and to the high ratio of scrap parts to acceptable parts. Therefore, disc brakes have found slow acceptance in the mass production vehicle industry and have been used mainly in the custom automobiles and limited production models. With the increased emphasis on safety in motor vehicles, there is greater pressure exerted on the industry to make the disc brake available in all models of automobiles but the sigh cost of production has been a major factor in the resistance to this pressure. The present invention is intended to provide a low cost, yet accurate method, for production of brake discs and a preferred apparatus useful in that method for locating and holding the disc to establish the accuracy of the grinding process.

SUMMARY

The method of this invention contemplates the completion of rough-turned brake discs in a precision finishing process to prepare them for installation in a vehicle. It includes the attachment of bearing members such as the outer cones or races of a pair of tapered roller bearings, the bearing members being attached in oppositely facing and spaced positions in the hub portion to define the axis of rotation of the disc. The disc member is then oriented and accurately located for grinding on one side, the location being determined from the spaced bearing members which are used for reference. The disc is then provided with a firm support against the side opposite the side to be ground, the support being applied against the disc in a floatng manner such that it will conform itself to the annular surface of the disc. After the support is permitted to conform itself to the disc it is locked into position to provide a rigid backing for the disc. The exposed side of the disc opposite the support apparatus is then ground as for example, by a rotary surface grinding operation wherein the disc is rotated on the axis defined by the bearing members. This provides a side that is finished flat and square with the axis of disc rotation. The disc is thereafter located and supported on this finished surface and the opposite side is ground parallel to it in a similar grinding operation except that the adjusting support is not used or required. The second side grinding operation will employ conventional surface grinding equipment such as a rotary surface grinder. Such a machine is shown and described in detail in U.S. Patent 1,718,554, issued June 25, 1929, and the description of the machine therein is specifically incorporated by this reference thereto and is exemplary of the well-known type of equipment used to perform the final steps of the process of this invention to produce the finished brake disc. This method will then provide accurate discs by use of a major proportion of equipment that is standard and relatively inexpensive.

The invention also contemplates the use of a preferred adjustable grinding support apparatus which will angularly float to engage and conform against one side surface of a disc held firmly on a fixed axis extending between and determined by the bearing members fixed in the disc hub as described. The adjustable support has provision for locking it in any position that it assumes in conforming with the engaged disc surface. The support and disc are then rotated in unison about the fixed axis during the grinding operation. This support apparatus also includes provision of a unique drive coupling mechanism so that plural stations can be used on an index base to allow part unloading and reloading while another disc is oriented and ground on one side after its support is oriented and fixed. The drive coupling mechanism is arranged to connect only with the station that is indexed to the position for grinding but does not interfere with rapid indexing of the stations between the loading and grinding positions.

THE DRAWINGS

FIG. 5 is a sectional view taken on line 5—5 of FIG. 2.

DETAILED DESCRIPTION

Figure 1:
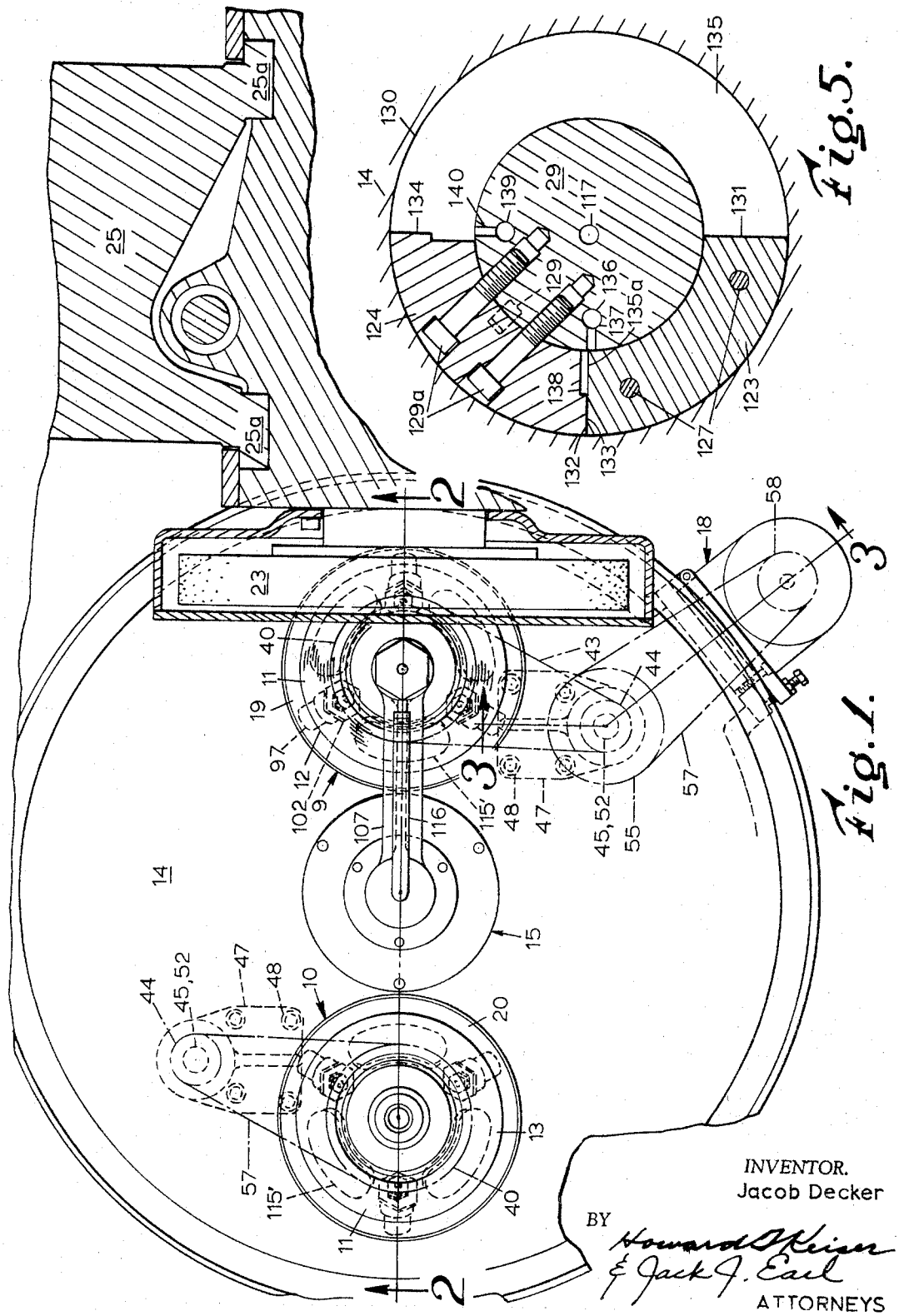
FIG. 1 is a plan view of the grinding machine of this invention, partly in elevation and partly in section.

The brake disc finishing process of this invention is performed in part by the apparatus exemplified by the structure shown in the attached figures and to which the following reference numerals apply. This apparatus also includes the preferred embodiment of work support and rotating mechanism in the station type indexing table machine shown. The machine is arranged to grind at one station the outer or exposed face 11 of a brake disc 12 which has been oriented, located and provided with rigid support while a second disc 13 is loaded onto the machine at a second station 10.

The grinding machine includes a swivel table 14 reciprocable angularly through 180 degrees by a vane motor 15; the pair of work stations 9 and 10 each rotatable with respect to the swivel table 14, when it is in the grinding machine, by a motor driven power unit 18 and each carrying a work table 19, 20 that is rotatable through a range of movement and rotatable with its work station 16, 17, respectively; and a grinding wheel unit 23 vertically adjustable on ways 25a of the bed 25 forming the support structure for the machine parts.

Normally the swivel table 14 rests on plain annular surfaces 24 (FIG. 2) formed on the bed 25 but when the table 14 is to be reciprocated about its center axis 26, conventional control circuits (not shown) release pressurized fluid through a conduit 27 into an annular groove 28 in the bed 25 causing the table 14 to float on a thin cushion of pressurized fluid. This also prevents foreign matter from lodging between the table and bed since the fluid (air) escapes outward from below the table 14. Excessive upward movement of the table 14 is prevented by a nut 29b which is threaded onto the column 29 and which is tightened against a thrust bearing 29c seated in a counterbore 29b in the cap 126, to be further described in connection with the vane motor 15 later herein.

The rotatable work stations 9, 10 are identical and are positioned diametrically opposite one another on the swivel table 14 and are angularly reciprocated through 180 degrees with the table 14 about the column 29 which is journalled through the swivel table 14 and fixed in the bed 25. Annular bearing surfaces 30 on the bed 25 support the base member 16 of the work station 9. When the station 9 is rotated, a cushion of pressurized fluid is provided by flow through inter-drilling 31 in the column 29 and the swivel table 14 to an annular groove 31a in the base member 16. Since the work station 10 in the loading position does not rotate at this time, no fluid is supplied to it although similar passages and grooves are provided in it and its base member 17.

Figure 3:
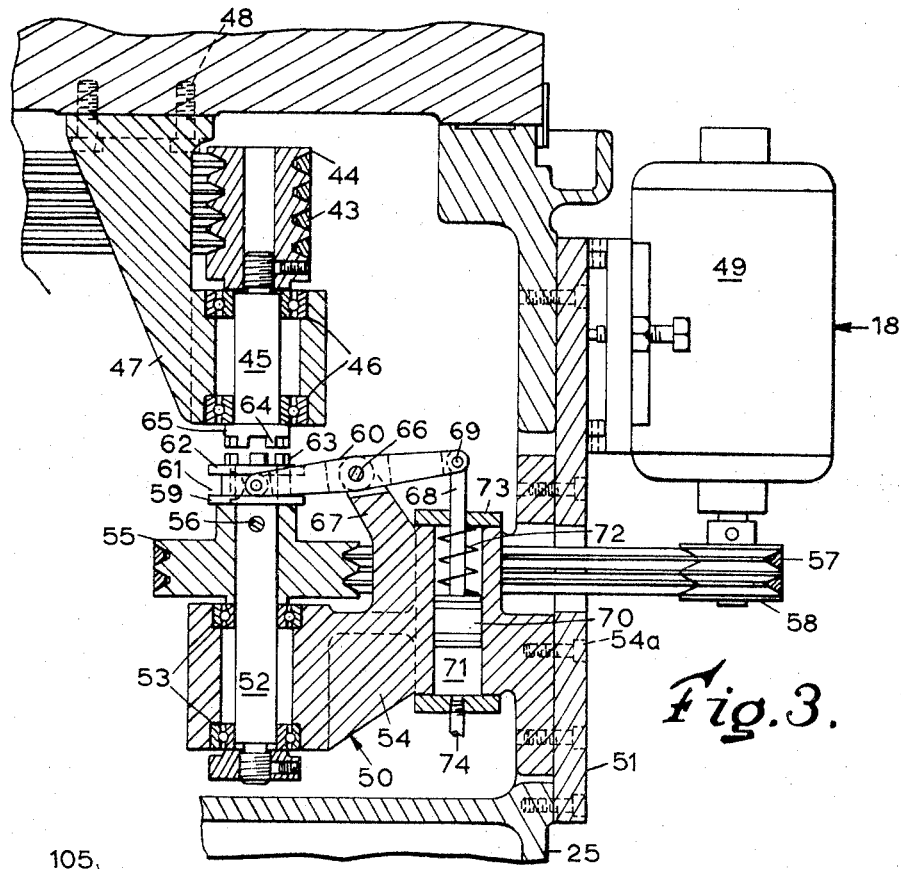
FIG. 3 is a sectional view taken on line 3—3 of FIG. 1.

The base member 16 is rotated by a rotary drive input to a sleeve 32 that is secured to the base member 16 by bolt 33 which extends through a shoulder 34 on the sleeve 32. The sleeve 32 is supported in anti-friction bearings 35 seated in counterbores 36 in both ends of a sleeve 37. The sleeve 37 is retained in a bore 38 extending through the swivel table 14 to its lower side where it is secured by bolts 39. A pulley 40 is secured on the lower end of the sleeve 32 by a lock nut 41 and a key 42 and is driven by belts 43 from a pulley 44 (FIGS. 1 and 3). The pulley 44 is threadedly secured to a shaft 45 which is supported in bearings 46 that are retained in a bracket 47. The bracket 47 is fixed to the underside of the swivel table 14 by machine screws 48.

The power unit 18 shown in FIG. 3 comprises a motor 49 and a clutch assembly 50, both fixed to a plate 51 that is mounted on the side of the bed 25. A clutch shaft 52 is journalled in bearings 53 that are retained in a bracket 54 secured to the plate 51 by bolts 54A. A pulley is secured on the shaft 52 by a pin 56 and the pulley 55 is driven by belts 57 from a motor pulley 58. A clutch sleeve 59 is carried on the shaft 52 and is keyed for rotation with that shaft but is axially movable therealong by operation of a shifter lever 60. The lever 60 has a forked end which engages an annular groove 61 in the sleeve 59 and it is this fork and groove combination which is operable upon the swing of the lever 60 to shift the clutch sleeve 59 along the shaft 52. Clutch teeth 63 are provided on the upper face 62 of the sleeve 59 and these are adapted to engage teeth 64 in the enlarged lower end 65 of the shaft 45. When these teeth 63 and 64 are engaged, rotational drive is transmitted between the sleeve 59 and the shaft 45.

The lever 60 is pivoted on a fulcrum 66 that is held by an arm 67 extending from the bracket 54 and is actuated by a piston rod 68 that is pivotally connected at one end 69 to the lever 60. The rod 68 extends from a piston 70 which is reciprocable in a cylinder 71 formed in the bracket 54. Normally the teeth 63 and 64 are maintained in engagement by a spring 72 compressed between the piston 70 and a cylinder cap 73. Disengagement of the teeth 63 and 64 is effected by admitting the pressurized fluid into the cylinder 71 through a conduit 74.

Figure 4:
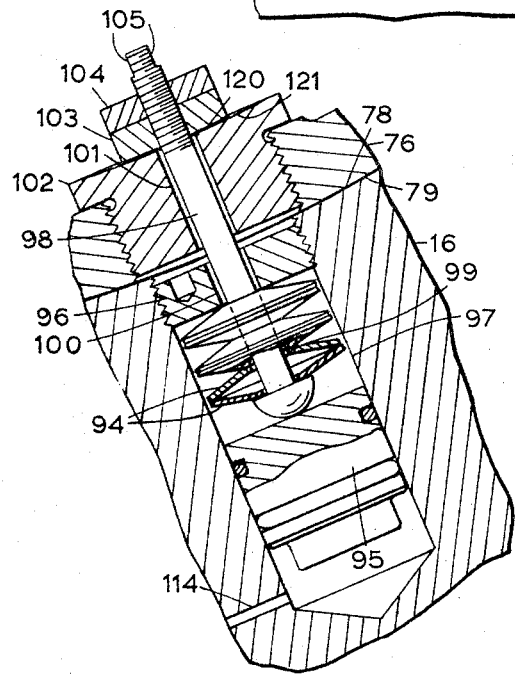
FIG. 4 is an enlarged sectional view of a portion of the sectional view of FIG. 2.

The work tables 19 and 20 of the work stations 9 and 10 are identical as to the structure and therefore only one is described in detail herein although both will be described as to their functions. The table 19 has a top 75 secured to a base 76 by bolts 77. The base 76 has a convex spherical surface 78 on its underside and this surface normally rests on a concave spherical surface 79 formed on the upperside of the base member 16. Both spherical surfaces have a common center 80 which lies in the rotational axis 81 of the sleeve 32. Therefore any tilting of the table 19 will be about the center 80 and the lateral movement will occur at the surface 78. To permit this lateral movement an oversized bore 82 is provided in the base 76 to clear the sleeve 32. The table base 76 normally is locked to the base member 16 by several sets of springs 94, one set of which is shown in FIG. 4 as being compressed between a piston 95 and a retaining screw 96 in a counterbore 97 of the base member 16. A bolt 98 is provided for adjusting the compression of the springs 94 and this bolt 98 passes through clearance holes 99, 100 and 101 of the springs 94, the screw 96 and a bushing 102 respectively and is threaded into a nut 102 and a lock 103 and a lock nut 104.

The center 21 is reciprocably disposed in a bore 83 through the sleeve 32 and is urged toward the workpiece 12 by a spring 84 between the lower end of the center 21 and a plug 85 threaded into the bore 83. Upward movement of the center 21 is limited by a rod 86 extending from the lower end of the center 21 through the plug 85 where stopnuts 87 are provided to engage the plug 85 when the center 21 is at its highest upward position. The spring 84 urges the center 21 upward so that its conical nose 88 will be urged into a conical bearing race 89 that is pressed into a counterbore 90 in the hub 92 of each of the workpieces 12, thus centralizing each of the bearing races 89 and workpieces 12 with regard to the axis 81.

The center 22 is provided at the grinding position and is adapted to engage a bearing race 91 located in the upper end of the hub 92 of each workpiece 12 and 13. The center 22 can be operated to urge the disc 12 and its inner face 93 toward the table top 75. For this purpose the center 22 is reciprocably disposed in a cylinder 106 formed in an arm 107 extending from and adjustably clamped to the upper end of the column 29. Normally the center 22 is held out of engagement with the bearing race 91 by a spring 108 that is compressed between a head 109 of a bolt 112 and a plug 110 in a counterbore 111 in the center 22. The bolt 112 which passes through the spring 108 and the plug 110 is anchored in a cap 113 on the cylinder 106 and it cannot move downward so that the center 22 is normally urged upward.

As each of the work stations 9, 10 is moved to the grinding position, automatic controls cause its work table, for example the work table 19, to be rendered free to tilt and the center 22 to centralize and clamp the workpiece 12 for grinding. To render the work table 19 free to tilt the spring pressure locking the table and base member 16 together is released and the work table 19 is floated on the base member 16. In order to release the spring pressure, pressurized fluid is admitted into the bore 97 through interdrillings 114 and the column 29, the swivel table 14, the sleeve 37, and the base member 16 causing the pistons 95 to move the bolts and nuts 103 upward and to compress the springs 94. This releases the pressure normally exerted through the nuts 103, the bushing 102 and the base 76 on the base member 16. At the same time pressurized fluid is admitted through interdrillings 115 in the column 29, the tables 14 and the base member 16, into pockets 115a formed in the spherical surface 79 thus causing the spherical surface 78 to be raised slightly therefrom and the work table 19 to float on a thin cushion of fluid therebetween.

As soon as the work table 19 is floated, pressurized fluid is admitted into the bore 111 above the center 22 through a conduit 116 and a passage 117 in the column 29. The center 22 is moved downward and a conical nose 118 thereon is forced into the conical bearing race 91 aligning it with the axis 81 and pressing the workpiece 12 firmly against the work table top 75. If there is angular inaccuracy of the face 93 with regard to the axis 81, the work table 19 is tilted about the center 80 by slippage along the spherical surfaces 78, 79. The bolt 98 remains radially disposed through the surfaces 78, 79, but the nut 103 is relatively moved over the bushing 102. A spherical surface 120 is provided on the lower face of the nut 103 to fit against a concave spherical surface 121 in the upper face of the bushing 102. These spherical surfaces are concentric with the surfaces 78, 79 to provide freedom of movement. When the work table 19 is oriented to conform to the face 93 the pressurized fluid is released from the pockets 115a and the bores 97 thus freeing the springs 94 to reclamp the work table 19 to the base member 16.

The clutch 50 is engaged after the work table 14 is clamped and the motor 49 is started to rotate the workpiece 12 in a rotary surface grinding operation wherein the wheel 23 is moved downward as the work is rotated. The nose 118 is shown in the figures as being a solid portion of the center 22 and as such it acts as a conventional "dead center" during this grinding operation. The nose 118 might also be a separate member rotatable on the center 22 to perform as a "live center" as is conventionally done to permit freer rotation. After the workpiece 12 is ground, the center 22 is withdrawn and the vane motor 15 is operated to swing the swivel table 14 through an arc of 180 degrees to bring the workpiece 13 to the grinding position and at the same time to carry the workpiece 12 to the loading position where it can be replaced by a new part while the previously loaded part 13 is being located and ground.

The vane motor 15 (FIGS. 2 and 5) is of conventional principle but is unique in design. It consists essentially of a vane 123 reciprocable with the table 14, a stationary vane 124, a retaining ring 125 and a retaining cap 126. The reciprocable vane 123 is secured to the cap 126 by bolts 127 and the cap 126 is fixed to the swivel table 14 by bolts 128. The stationary vane 124 is secured against rotation by attachment of the column 29 by a key 129 and bolts 129a. Both of the desired vanes are disposed in a counterbore 130 in the table 114 and lie between the cap 126 and the ring 125, the latter of which is seated at the bottom of the counterbore 130.

As shown in FIG. 5 the vanes 123 and 124 are of arcuate shape and each vane has two radial faces 131, 132 and 133, 134 respectively disposed at an angle of 90 degrees to each other. The vane 123, the table 14 carrying the cap 126 and the ring 125 are all reciprocable as a unit about the column 29. The result is that the volume of a chamber 135 bounded by the counterbore 130, the column 29, the cap 126, the ring 125 and the faces 131, 134 is varied inversely as the volume of a chamber 135a bounded by the counterbore 13, the column 29, the cap 126, the ring 125 and the faces 132 and 133 is varied. When pressurized fluid is admitted through a passage 136 and a port 137 in the column 29 into a recess 138 in the face 133, the vane 123 is moved counterclock-wise (as viewed in FIG. 5) until the face 131 abuts the face 134.

In the position shown, the port 137 is partially closed by the cane 123 so the flow of fluid into the recess 138 is restricted until the vane 123 has completely uncovered the port 137. Consequently the vane 123 moves slowly at first and then accelerates until full flow is attained through the port 137. At the same time that the automatic controls admit fluid into the passage 136, they also render a passage 139 and a port 140 open to exhaust permitting the fluid in the chamber 135 to escape therethrough. When the vane 123 in its angular movement reaches the port 140, that port is restricted (as was the port 137) by the vane 123 and its movement is decelerated until the face 131 lightly abuts against the face 134.

Figure 2:
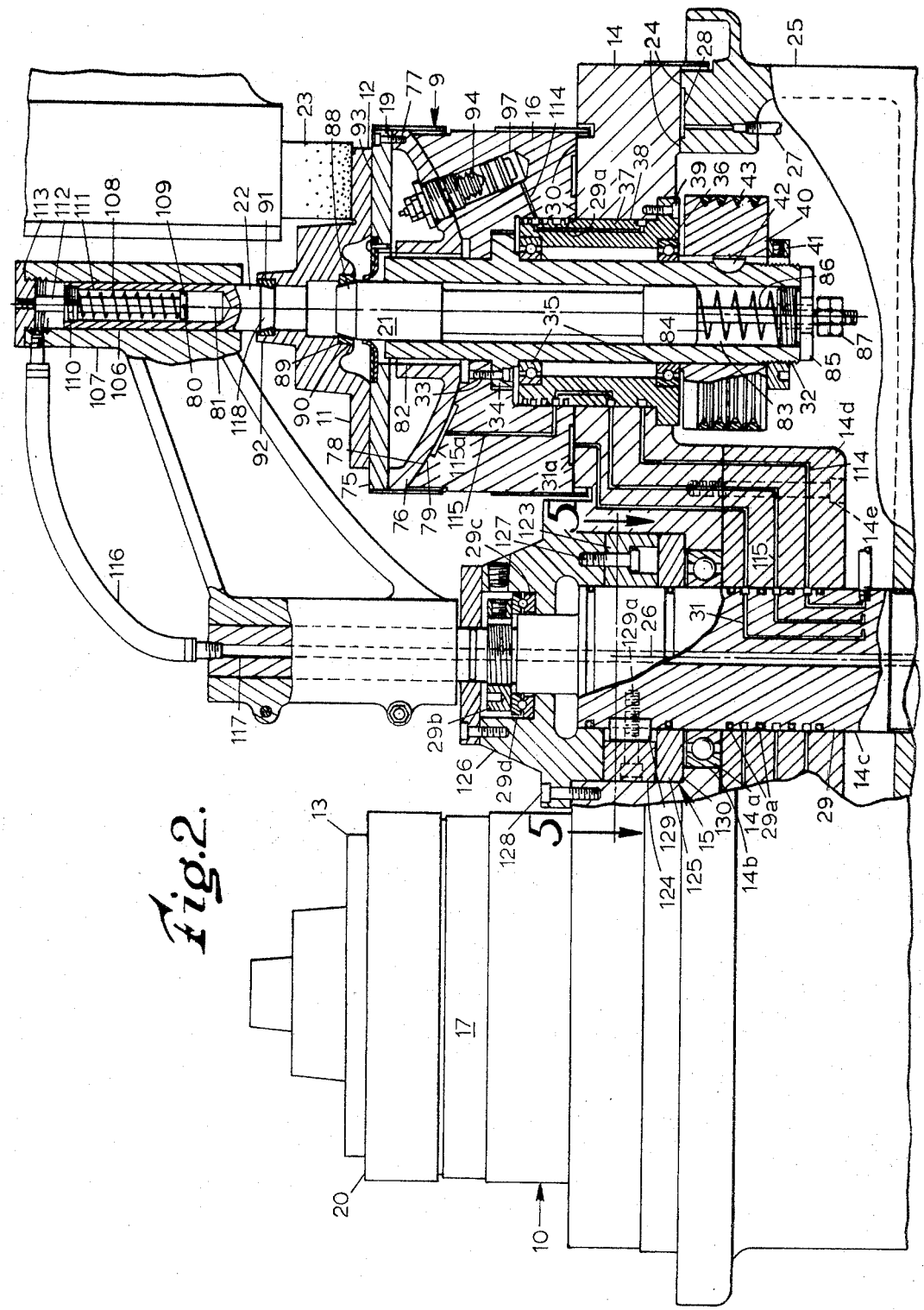
FIG. 2 is a sectional view taken on line 2—2 of FIG. 1 showing one workpiece at a grinding station and one at a loading station.

After the workpiece is ground the automatic controls connect the passage 136 to exhaust pressure and the passage 139 to high pressure whereupon the vane 123 is reciprocated clockwise into the position shown to swing another workpiece into the grinding position while swinging the finished workpiece back to the loading station for replacement by an unfinished part. Attention is called to the use of conventional annular seals 29a on the column 29 and the sleeve 37 where leakage of pressurized fluid would occur. Referring to FIGS. 2 and 5 when pressurized fluid is admitted to the chamber 135, there is a tendency toward distortion of the column 29 resulting in a binding between the counterbore 130 and the vane 124 and also of a binding of a vane 123 between the counterbore 130 and the column 29. To minimize this tendency an antifriction bearing 14a is inserted between the column 29 and a bore 14b in the table 14. The bore 14b is concentric with a bore 14c through a cap 14d fixed to the underside of the table 14 by bolts 14e and these facilitate the interdrilling (shown diagrammatically) of the table 14.

It can be seen from the above description and the accompanying drawings that an automatically controlled grinding apparatus and unique fixturing has been provided to perform steps of the process of this invention. The apparatus will grind one face of a brake disc flat and square with its hub axis despite an angular inaccuracy of the other face by which it is firmly supported during the grinding operation. The other side of the disc can now be ground on a conventional rotary surface grinder as previously described by location of the part on the first ground side. The result is accurately finished discs with a minimum of investment in unique equipment. At the same time production rates can be high due to the low amount of time lost in the process by virtue of the described and preferred unique fixturing and machinery. It is understood that the specific features referred to herein are for the purpose of illustration only and are not intended to limit the scope of the invention.

What is claimed is:

1. A grinding machine fixture for orienting a brake disc member relative to a reference axis of rotation thereof determined by axially spaced bearing surfaces in a hub portion and for supporting an annular flange portion extending radially from the hub, the apparatus comprising:
    (a) locating means for rigidly holding the brake disc member by engagement with said bearing surfaces in the hub,
    (b) support means for engaging one side of the flange portion of a brake disc member held by said locating means, said support means freely adjustable to conform to and contact the annular area of the flange portion,
    (c) means for locking said support means in position against the flange portion to provide a rigid structure thereagainst, and
    (d) means for rotating said support means and brake disc member in unison on an axis of rotation coinciding with the reference axis.

2. A grinding machine fixture for orienting a brake disc member relative to a reference axis of rotation thereof determined by axially spaced bearing surfaces in a hub portion and for supporting an annular flange portion extending radially from the hub, the apparatus comprising:
    (a) means for engaging said spaced bearing surfaces to rigidly hold the brake disc member,
    (b) a platen having an annular support surface adapted to engage against one side of said flange portion when the brake disc member is held by said means for engaging,
    (c) means for supporting said platen to tilt freely and universally over a predetermined range to permit said support surface to conform to and bear against said one side,
    (d) means operable for locking said platen in position with said support surface against said one side, and (e) means for rotating said platen and brake disc member in unison on an axis of rotation coinciding with the reference axis.

3. The apparatus of claim 2 wherein:
(a) said platen includes a convex spherical surface on the side opposite said support surface,
(b) a base member is provided having a concave spherical surface therein for receipt of said convex surface,
(c) said means for locking is a releasable clamping mechanism operable to forcefully hold said platen and base member together to prevent relative movement therebetween, and
(d) said means for rotating operates directly on said base member for rotation thereof.

4. The apparatus of claim 3 wherein:
(a) means are provided for supplying fluid under pressure between said spherical surfaces to cause said platen to float upon said base member and tilt freely when said clamping mechanism is released.

5. An apparatus for grinding side faces of flanges extending radially outward from and around center hub portions of brake disc members to a predetermined relationship with a reference axis of rotation in each brake disc member, the reference axis of each determined by axially spaced bearing surfaces in the hub portion thereof, the apparatus comprising:
(a) a machine base having an annular way extending around the top thereof,
(b) a table received on said machine base and having an annular surface adapted to fit against said annular way to provide matched bearing surfaces between said table and machine base to permit relative angular movement therebetween,
(c) a plurality of fixtures mounted on said table at angularly spaced locations, each of said fixtures having
(1) support means for engaging the annular area of one side of the flange of a brake disc member, said support means freely adjustable to conform to and contact against said one side,
(2) means operable for locking said support means in a selected position,
(3) a centering member extending through said support means to engage one bearing surface in the hub of a brake disc member, said centering member yieldable when a substantial force is applied thereagainst, and
(4) a coupling for connection of a rotary drive input to rotate said support means,
(d) means for angularly swinging the table on said machine base to shift one of said fixtures to a grinding station, and another of said fixtures to a loading and unloading station,
(e) a clamping center above the table at the grinding station and operable to extend and forcefully engage the other bearing surface of a brake disc member opposite said one bearing surface engaged by said centering member whereby said brake disc member at the grinding station is oriented for grinding and the support means is conformed to the annular surface of said one flange side prior to operation of said means for locking,
(f) a power source in the machine base at said grinding station having an output member operable to drivingly engage said coupling of each fixture at the grinding station, and
(g) an abrasive tool at the grinding station adapted to engage and grind the exposed side of the brake disc flange at the grinding station.

6. The apparatus of claim 5 wherein:
(a) said support means is a platen having an annular support surface adapted to engage said one flange side of the brake disc members, and
(b) means are provided to permit free and universal tilting motion of said platen over a range of movement.

7. The apparatus of claim 6 wherein:
(a) each of said fixtures includes a fixture base member supported on said table for rotation thereon,
(b) a concave spherical surface area is provided on said fixture base member,
(c) said platen has a convex spherical surface opposite said annular support surface adapted to fit said concave spherical surface to provide the tilting motion thereof, and
(d) said means for locking operates to hold said spherical surfaces firmly together.

8. The apparatus of claim 7 wherein:
(a) means are provided for supplying fluid under pressure through said table and fixture base member to the area between said spherical surfaces to cause said platen to float upon said base member and tilt freely when said clamping mechanism is released.

References Cited

UNITED STATES PATENTS

| | | | |
|---|---|---|---|
| 551,243 | 12/1895 | Westphal | 51—106 |
| 1,588,739 | 6/1926 | Johnson | 51—108 |
| 1,718,554 | 6/1929 | Greensmith | 51—51 |
| 1,845,944 | 2/1932 | Trunec | 51—106 |
| 1,989,517 | 1/1935 | Holmes | 51—108 |
| 2,177,898 | 10/1939 | Leguillon et al. | 51—108 X |
| 2,272,055 | 2/1942 | Carlson | 51—108 |

LESTER M. SWINGLE, *Primary Examiner.*

U.S. Cl. X.R.

51—108, 237